UNITED STATES PATENT OFFICE.

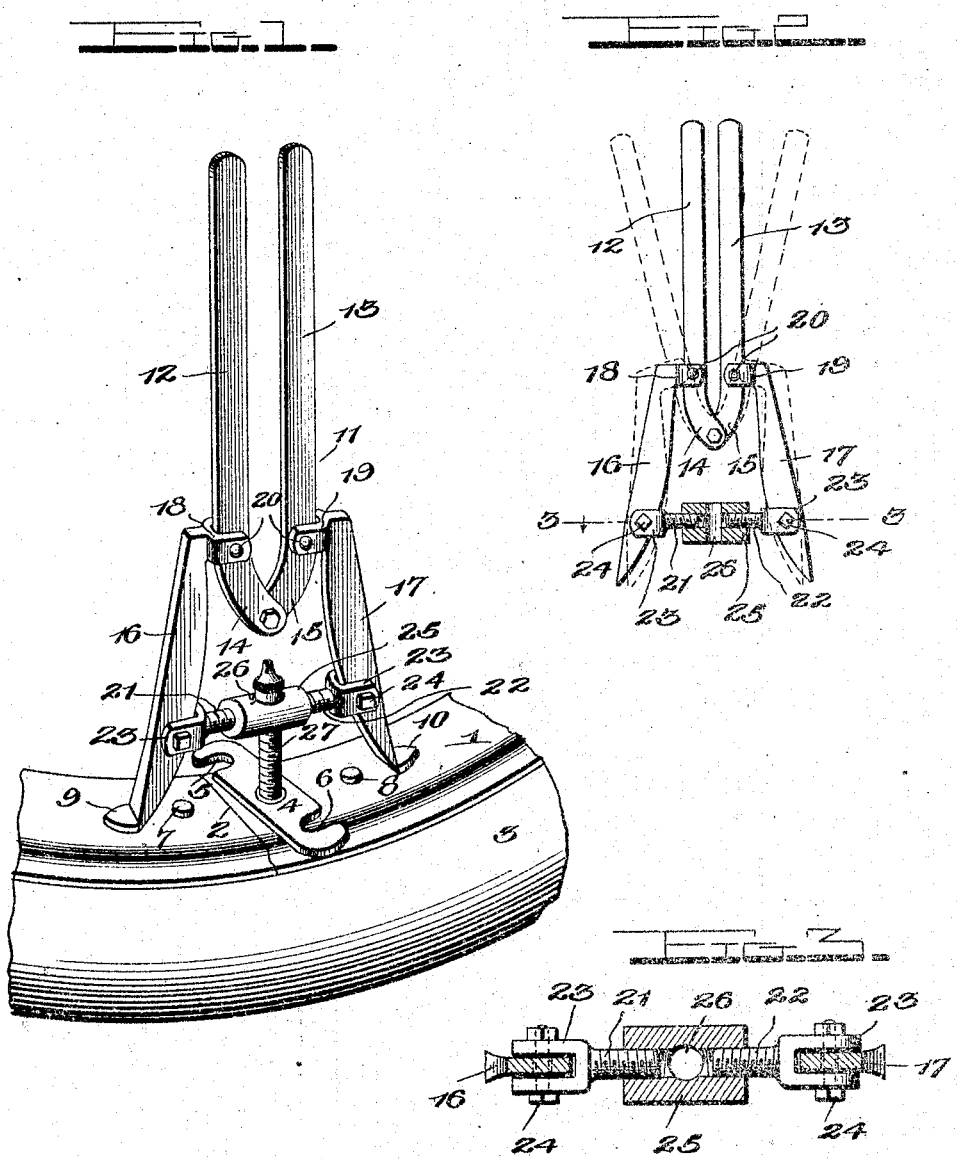

ROY W. DAMARON, OF JACKSON, MICHIGAN.

TIRE-TOOL.

1,189,923.  Specification of Letters Patent.  Patented July 4, 1916.

Application filed July 15, 1915. Serial No. 40,014.

*To all whom it may concern:*

Be it known that I, ROY W. DAMARON, a citizen of the United States, residing at Jackson, in the county of Jackson and State of Michigan, have invented certain new and useful Improvements in Tire-Tools; and I do declare the following to be a full, clear, and exact description of the invention, such as will enable others skilled in the art to which it appertains to make and use the same.

This invention relates to automobile accessories and more particularly to a tool for use in connection with the placing on and removal of tires from demountable rims of the split ring type.

The object of the invention is to provide a simply constructed and efficient tool of this character which is easily operable to expand a rim to permit a tire casing to be placed on or removed therefrom.

With this and other objects in view the invention consists of certain novel features of construction and the combination and arrangement of parts as will be hereinafter more fully described and claimed.

In the accompanying drawings: Figure 1 represents a perspective view of a portion of a demountable rim and tire with this improved tool shown applied in the act of spreading the rim to provide for the connection of the split ends thereof; Fig. 2 is a side elevation of the tool partly in section; Fig. 3 is a transverse section taken on the line 3—3 of Fig. 2.

In the embodiment illustrated a demountable rim 1 is shown of the split ring type being severed at 2 to provide opposing end portions which normally have end thrust abutting contact as shown in Fig. 1. A tire casing or shoe 3 is mounted on this rim in the usual manner, the rim being preferably made of spring metal to permit a limited contraction or expansion thereof without breaking.

A locking lever or bar 4 is pivotally mounted intermediately of its ends, preferably midway thereof, on one end of the split rim 1 and is of a length sufficient to span the split portion of the rim when the ends are in abutting relation and to project beyond said ends for a purpose to be described. This locking bar or lever 4 is provided in its opposite edges near its opposite ends with notches 5 and 6 which are designed to engage studs 7 and 8 which project laterally from the outer faces of the ends of the split rim 1 and are so positioned that when the notched ends of the lever 4 are engaged therewith, said ends will be held in closed operative position. Lugs 9 and 10 are also carried by the rim 1 at points spaced inwardly from the studs 7 and 8 having straight edges facing toward the ends of the rim to afford abutting contacts for the jaws of the tool 11 to be described. This tool 11 which constitutes the invention comprises a pair of handles or levers 12 and 13 having their inner ends curved laterally inward as shown at 14 and 15 with the terminals of said curved ends arranged in overlapping relation and pivotally connected to adapt the handles 12 and 13 to be moved toward or away from each other for a purpose to be described.

Rim spreading jaws 16 and 17 are shown connected with the handles 12 and 13 at points intermediate the ends of the latter, said jaws being here shown connected with said handles at the inner ends or bases of the curved portions 14 and 15 of the handles 12 and 13. These jaws are here shown provided at their inner ends with laterally extending bifurcated arms 18 and 19 which straddle the handles 12 and 13 and are connected thereto by rivets 20. These jaws 16 and 17 may be of any suitable or desired construction and are here shown tapered toward their outer ends and at their outer edges flattened for engagement with the straight inner faces of the lugs 9 and 10 on the rim as is clearly shown in Fig. 1, so that when said jaws are engaged with said lugs all danger of their slipping is avoided. These jaws 16 and 17 are adjustably connected by a turn buckle like structure herein shown in the form of threaded rods 21 and 22 having yokes 23 on their outer ends which are designed to straddle the inner edges of the jaws 16 and 17 and be connected thereby by bolts 24 which pass through the arms of the yoke and through the jaws as is shown clearly in Fig. 3. The inner free ends of these rods 21 and 22 are adjustably connected by an internally threaded sleeve 25 the threads of said sleeve at its opposite ends being right and left handed respectively and adapted to engage corresponding threads on the rods 21 and 22 so that on the turning of the sleeve in one direction or the other, said rods will be brought closer together or moved away from each other at the will of the operator. This sleeve 25 has a bore 26 extending transversely therethrough in a plane at right angles to its longitudinal bore and which is designed to receive the valve stem 27 which extends through a hole in the rim in the usual manner and through an aperture in the locking lever 4 which is here shown at a point midway the ends thereof forming a fulcrum for said lever, as is shown in Fig. 1 and which permits the adjusting rod of the tool to be positioned as low as possible to afford more purchase power for the tool in expanding the rim.

In the use of this improved tool when the ends of the rim 1 are to be spread apart either for disengaging or for connecting it to the shoe 3, the locking bar 4 is first disengaged from the studs 7 and 8 by swinging it on its pivot into the position shown in Fig. 1. The free ends of the jaws 16 and 17 of the tool 11 are then engaged with the inner faces of the lugs 9 and 10 carried by the rim 1 and said jaws are forced apart, the connected rods 21 and 22 mounted on the rod 27 forming a fulcrum for said jaws so that on the forcing of the handles 12 and 13 toward each other the free ends of said jaws will be moved outwardly and thereby exert a spreading action on the rim ends separating them from their abutting engagement and adapting one end to be sprung inwardly to permit the contraction of the rim a sufficient distance to disengage the tire therefrom and said tire may then be readily removed from the rim for repairs or for the substitution of another tire. The same operation is performed when it is desired to spread the rim ends for connecting the rim with the tire, it being understood of course that the tire is first placed in position on said rim and the free ends of the jaws 16 and 17 engaged with the lugs 9 and 10 and spread apart until the rim ends are properly positioned to bring the terminals thereof into abutting engagement as shown in Fig. 1 and when in this position the locking bar is swung on its pivot to bring the notches 5 and 6 thereof into locking engagement with the studs 7 and 8 whereby the rim will be securely held in engagement with the tire.

From the foregoing description it will be obvious that this simply constructed tool may be quickly applied to a tire to be detached from a rim and operated in the manner above described.

I claim as my invention:

1. A tire tool comprising handles spaced apart and pivotally connected at one end, jaws pivotally connected at one end to said handles at points intermediate the ends of the latter and adjusting means arranged between and connecting said jaws adapted to control the position of the jaws relatively to each other.

2. A tire tool comprising handles spaced apart and pivotally connected at one end, jaws pivotally connected at one end to said handles at points intermediate the ends of the latter, and means for adjustably connecting said jaws.

3. A tire tool comprising handles spaced apart and pivotally connected at one end, jaws pivotally connected at one end to said handles at points intermediate the ends of the latter, threaded rods pivotally connected at one end to said jaws, and an internally threaded sleeve engaged with the free ends of said rods for adjusting said jaws toward or away from each other, said sleeve having a bore extending transversely therethrough for the passage therethrough of a valve stem.

4. A tire tool comprising a pair of parallel handle bars having their inner ends bent inwardly and pivotally connected at their terminals, jaws having laterally extending bifurcated arms straddling and pivotally connected with said handle members at points intermediate the ends of the latter, and means for adjustably connecting said jaws intermediately of their ends.

5. A tire tool comprising handles spaced apart and pivotally connected at one end, a pair of jaws tapering toward one of their ends and having their outer edges flattened, said jaws being provided at their other ends with laterally extending bifurcated arms to straddle said handles, rivets extending through said arms and said handles to pivotally connect said jaws to the latter, and means for adjustably connecting said jaws, substantially as and for the purpose set forth.

In testimony whereof I have hereunto set my hand in presence of two subscribing witnesses.

ROY W. DAMARON.

Witnesses:
JOHN W. KNIGHT, Jr.,
GEO. M. SPININAY.